E. B. HELLER.
PROCESS OF TREATING FOODS.
APPLICATION FILED APR. 13, 1910.
1,090,210.
Patented Mar. 17, 1914.
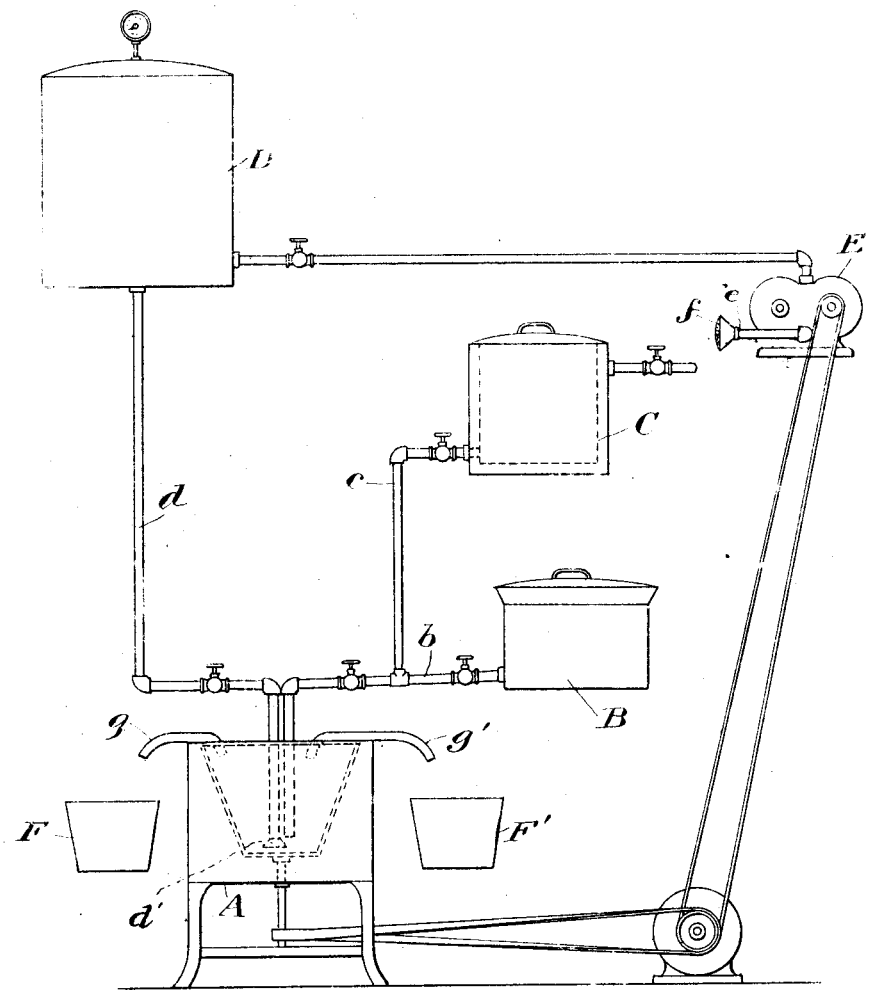
WITNESSES:
INVENTOR:
Ernest B. Heller
BY
ATTORNEYS

UNITED STATES PATENT OFFICE.

ERNEST B. HELLER, OF PHILADELPHIA, PENNSYLVANIA, ASSIGNOR TO ALBERT B. BRANDLY, OF LITTLE FALLS TOWNSHIP, NEW JERSEY.

PROCESS OF TREATING FOODS.

1,090,210.  Specification of Letters Patent.  Patented Mar. 17, 1914.

Application filed April 13, 1910. Serial No. 555,137.

*To all whom it may concern:*

Be it known that I, ERNEST B. HELLER, a subject of the Emperor of Germany, residing in the city of Philadelphia, county of Philadelphia, and State of Pennsylvania, have invented a certain new and useful Process of Treating Foods, of which the following is a specification.

This invention is a process or method of refining fats and oils, particularly butter, butter fat, or oil, and of combining such fats and oils with whole milk, cream, skimmed milk, butter milk, etc., so as to produce thoroughly emulsified solid, liquid or semi-liquid food products of a distinctly novel form.

Among the salient features of the process is the subjecting of the liquid or molten oil or fat to centrifugal action for removing the impurities therefrom, either alone, or in conjunction with the step of commingling air, ozone, ozonized air, oxygen, or electrified air with such oil or fat.

The invention embodies, also, the carrying out of such process or operation, or processes and operations, while introducing into the oils or fats thus treated either whole milk, skimmed milk, cream, butter milk, etc., and in some instances water, for the purpose of completely emulsifying these latter products, either separately or combined, with the butter or other fat under treatment.

Heretofore many attempts have been made to produce perfect and stable emulsions of the character referred to, but such attempts have not been successful. My process, however, produces such emulsions, and *e. g.*, will convert rancid butter, or fresh pure butter, into the emulsified condition similar to that in which it existed originally in the milk or cream. When rancid or "processed" butter has been converted into this form, it can then be ripened, rechurned and made into butter having a superior grain and texture. The process renders it feasible, moreover, to take various kinds of butters, *e. g.*, those received from different dairies and possessing different characteristics as to color, fat content, etc., and convert the mixture into a homogeneous product of high quality.

Other features of the invention not hereinbefore referred to will be apparent from the following detailed description and claims taken in conjunction with the accompanying drawing.

This drawing shows one form of apparatus which I have found practicable in carrying out the invention, but it will be understood that this apparatus is illustrative only, and that other forms of apparatus may be availed of.

Referring to the drawings, A is the centrifuge, or centrifugal liquid separator, B a tank for containing the milk or other liquid, having a valved pipe, *b*, through which such liquid may be fed to the centrifuge; C, a steam jacketed tank for containing the butter, butter oil, or other fat, having a valved pipe, *c*, whereby such fat or oil may be introduced into the centrifuge; D a closed tank for containing air or other suitable gas under pressure and having a valved pipe, *d*, provided at its end with a distributing nozzle, *d'*, for introducing the air or gas into the centrifuge. Tank, D, is supplied with air or gas by a blower, E, having an inlet, *e*, in which is a filter, *f*, said pipe being connected with either an air supply, ozone, ozonized air, electrified air, etc. The outlet, *g*, from the centrifuge, leads to a tank, F, which receives the emulsified product. I may also provide an additional outlet *g'* leading to vat F.

When it is desired to merely purify or refine the butter, butter oil, fat, etc., it is preferably liquefied in tank, C, unless normally in a liquid condition, although it might be heated in the centrifuge. Assuming it is in vat, C, in a liquid condition, it is allowed to run into the centrifuge, which is rotated, as usual, at a high rate of speed. The impurities of a volatile character are thrown off into the atmosphere, while the gummy or resinous substances always found in old or rancid butter, and other solid impurities, are thrown to the sides of the revolving bowl, and remain there until removed as usual. The purified butter or oil is discharged in a stream through off-take, *g*, and pass into vat, F. It is preferred, however, to carry out the foregoing process in conjunction with air, or one of the other gases or mixture thereof, mentioned, as such air or gas aerates and materially aids in the purification process. The air and oil are introduced preferably through separate pipes into the bottom of the centrifuge and are thus thoroughly commingled. The air or gas breaks up the oil or fat and in this way performs a mechanical function similar to the vane or plates frequently used in centrifuges.

When it is desired to emulsify milk, water, or other agent specified, with the oil or fat for the purpose of producing an emulsion, this may be done by introducing the two or more products or substances into the centrifuge as described, either with, or without, the air or other gas, although, for the reasons given, I prefer to employ such air or gas. By properly rotating the centrifuge, i. e., by not speeding it up too high, the oil or fat and other agent are thoroughly commingled or emulsified, the mechanical action of the air or gas, when used, materially assisting the operation.

The character of the resulting emulsions, so far as concerns its fat content, will depend, of course, on whether I employ skimmed milk, butter milk, cream, etc., and, also, on the particular oil or fat used. In addition to butter, butter oil, etc., I may use olive, cotton seed, cocoanut, lard oil, olein, etc., or mixture of any two or more of them.

The emulsified product, e. g., that obtained from butter fat and milk, is in the form of a perfect emulsion having characteristics similar to those of natural cream, can be cooled, pasteurized, ripened, churned, etc., and will produce a butter having the body, grain and other characteristics of pure butter.

Having thus fully described the invention, what I claim as new, and desire to secure by Letters Patent is:—

1. The process of purifying and emulsifying butter which consists in liquefying it, then subjecting it to the action of centrifugal force, and then emulsifying it with a suitable agent.

2. The process of purifying and emulsifying butter which consists in liquefying it, then subjecting it to the action of centrifugal force while introducing a suitable gas therein, and then emulsifying it with a suitable agent.

3. The process of purifying and emulsifying butter which consists in liquefying it, then subjecting it to the action of centrifugal force while introducing air therein, and then emulsifying it with a suitable agent.

4. The process of purifying and emulsifying butter which consists in liquefying it, then subjecting it to the action of centrifugal force while introducing electrified air therein, and then emulsifying it with a suitable agent.

5. The process of emulsifying liquid fats and oils which consists in simultaneously commingling a gas therewith and subjecting them to a rapid rotary action, and then emulsifying the same with a suitable agent.

6. The process of producing emulsions which consists in mixing oil and a lacteal fluid and subjecting them to centrifugal action while introducing a gas, such as air, ozonized air, electrified air, etc., into the mixture.

In testimony whereof I have signed my name to this specification in the presence of two subscribing witnesses.

ERNEST B. HELLER.

Witnesses:
 JAS. H. GRIFFIN,
 H. I. BERNHERD.